United States Patent [19]

Kawamura

[11] Patent Number: 5,117,083
[45] Date of Patent: May 26, 1992

[54] JUMP CONTROL SYSTEM FOR AN ELECTRIC DISCHARGE MACHINE

[75] Inventor: Hideaki Kawamura, Hachioji, Japan

[73] Assignee: Fanuc Ltd., Minamitsuru, Japan

[21] Appl. No.: 635,608

[22] Filed: Jan. 2, 1991

[30] Foreign Application Priority Data

May 15, 1989 [JP] Japan .................. 1-120855

[51] Int. Cl.⁵ ............................ B23H 7/32; B23H 7/20
[52] U.S. Cl. ........................... 219/69.16; 219/69.13; 219/69.19
[58] Field of Search ............... 219/69.16, 69.2, 69.13, 219/69.17, 69.14; 364/474.04; 204/129.25

[56] References Cited

U.S. PATENT DOCUMENTS

| | | | |
|---|---|---|---|
| 3,739,136 | 6/1973 | Marendaz | 219/69.13 |
| 3,909,577 | 9/1975 | Houman | 219/69.14 |
| 4,335,436 | 6/1982 | Inoue | 219/69.16 |
| 4,504,722 | 3/1985 | Kishi et al. | 219/69.13 |
| 4,700,039 | 10/1987 | Konno et al. | 219/69.16 |
| 4,822,970 | 4/1989 | Levy et al. | 219/69.16 |
| 4,952,790 | 8/1990 | Futamura | 219/69.13 |

FOREIGN PATENT DOCUMENTS

60-259321 12/1985 Japan .
63-2613 1/1988 Japan .................. 219/69.16

Primary Examiner—Geoffrey S. Evans
Attorney, Agent, or Firm—Staas & Halsey

[57] ABSTRACT

A jump control system for an electric discharge machine for controlling a jump of the electrical discharge machine. A discharge state is estimated from a discharge voltage (Vn, Vm, Tn) and a discharge current (In) between an electrode (34) and a workpiece (35), and a fuzzy inference is effected by a fuzzy control unit (12) using the estimated discharge state as an input, thereby obtaining an increment ($\delta T$) of a jump period and an increment ($\delta D$) of a jump distance. A jump period/distance modifying means (23) is used to obtain the jump period (T) and the jump distance (D), and a jump control means (24) executes a jump control based on these values, to thereby effect an electrical discharge machining. Thus, the machining speed can be increased, and the electrical discharge machining state can be improved.

11 Claims, 6 Drawing Sheets

JUMP CONTROL SYSTEM FOR AN ELECTRIC DISCHARGE MACHINE

DESCRIPTION

1. Technical Field

The present invention relates to a jump control system for an electric discharge machine, and more particularly, to a jump control system for an electric discharge machine in which a jump period and jump distance corresponding to the discharge state are automatically decided by a fuzzy control.

2. Background Art

In an electrode feed control in an electric discharge machine such as an electric discharge engraving machine, an average voltage of a discharge voltage waveform and a delay time before the start of an electric discharge, etc., are detected, and the distance between the electrode and a workpiece is controlled by servomotors so that these detected values are adjusted to a reference target voltage or a reference target delay time.

The control of the distance between the electrode and the workpiece is generally effected in the following manner.

(a) The average voltage of the discharge voltage waveform or the delay time before the start of the electric discharge is detected.

(b) The difference between this detected value and the reference target voltage or the reference target delay time is obtained.

(c) A value obtained by multiplying this difference by a certain gain is used as a move command for the servomotors.

(d) The above items (a) to (c) are repeated at predetermined intervals.

Accordingly, the electrodes are controlled so as to always obtain a reference target distance.

In such an electrical discharge machining, sludge (machining tailings) accumulates between the electrode and the workpiece, and therefore, a jump control is effected in which the electrodes are moved far apart, to discharge the sludge, and are then returned to their respective original positions.

Although this jump control is essential to an electrical discharge machining, it makes no contribution to the electrical discharge machining itself. Therefore, if the jump period of the jump control is too short, or if the jump distance is too long, the electrical discharge machining time is prolonged. On the other hand, if the jump period is too long, or if the jump distance is too short, an ineffective electric discharge, such as an arc or a short, frequently occurs, and thus the discharge state becomes unstable, the machining speed is lowered, and the accuracy of the machined surfaces is poor.

Further, the discharge state is momentarily changed by various factors, for example, the amount of sludge between the electrode and the workpiece, the machining depth, the ionic conditions of machined portions, and the machining shape, etc., and thus it is difficult to accurately detect the discharge state due to the existence of many ambiguous factors. In the conventional electrical discharge machining, therefore, the jump conditions are decided before the machining, on the basis of experience and experiments, and assuming the existence of the worst case.

For a high-speed stable machining, however, the jump control conditions must be optimally controlled during the machining operation, depending on the discharge state, and thus the method of controlling the jump period and jump distance during the machining operation is one of the most important problems now confronting the existing electrical discharge machining technique.

DISCLOSURE OF THE INVENTION

The present invention has been contrived in consideration of these circumstances, and an object thereof is to provide a jump control system for an electric discharge machine in which a jump period and jump distance corresponding to the discharge state are automatically decided by a fuzzy control.

To solve the above problem, according to the present invention, there is provided a jump control system for an electrical discharge machine for controlling a jump of the electrical discharge machine, in which machining is effected while automatically setting the period and distance of the jump to optimum values by a fuzzy control, using the discharge state of the electrical discharge machine as an input.

The optimum jump period and distance are controlled by the fuzzy control based on the discharge state, and accordingly, the machining speed and the electrical discharge machining state can be improved, thereby ensuring an improved accuracy of the machined surfaces.

BEST MODE OF CARRYING OUT THE INVENTION

One embodiment of the present invention will now be described with reference to the drawings.

Figure 1:
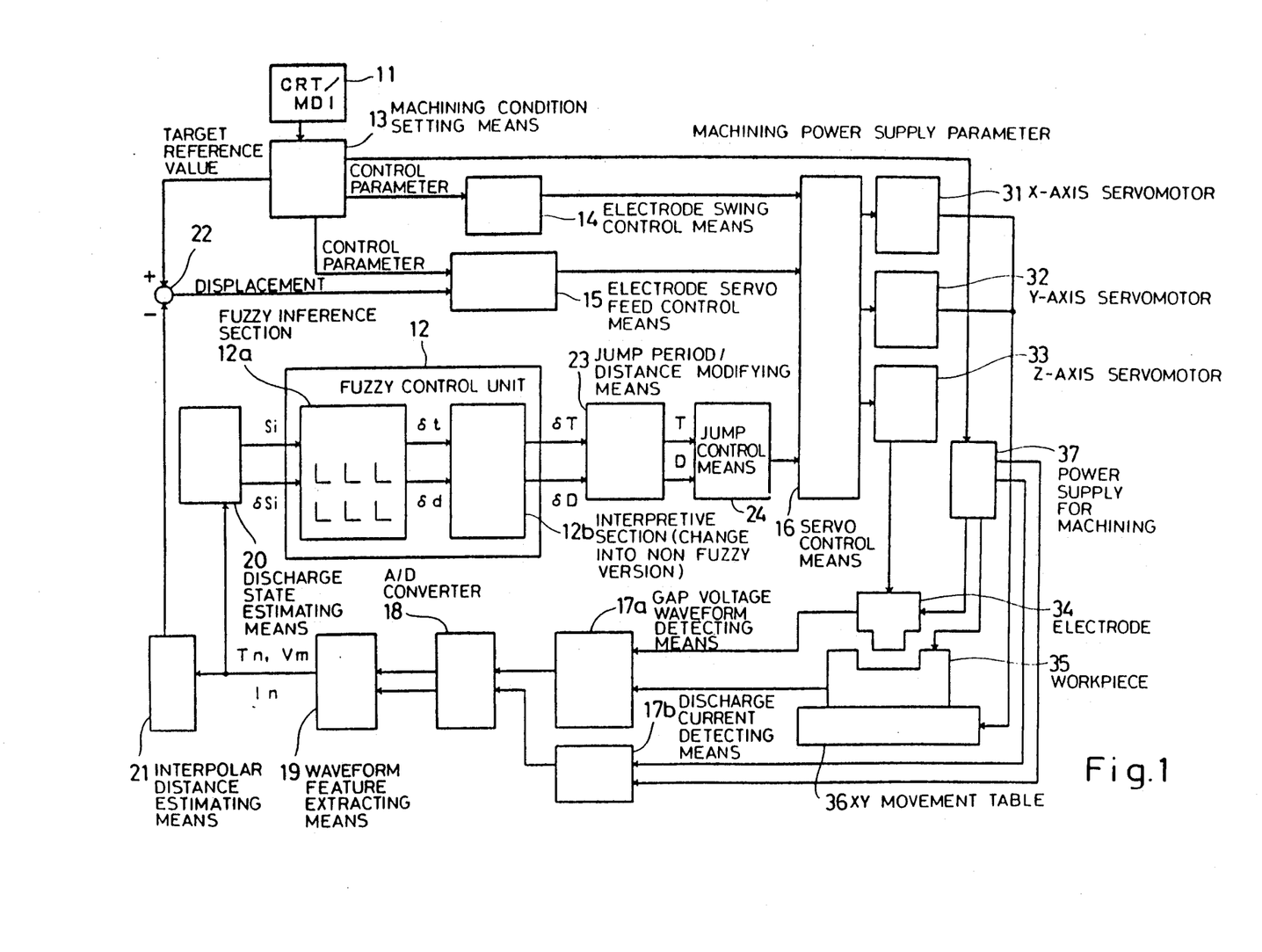
FIG. 1 is a diagram showing an outline of a CNC electric discharge engraving machine according to one embodiment of the present invention.

FIG. 1 is a diagram showing an outline of a CNC electric discharge engraving machine according to one embodiment of the present invention.

The electric discharge machine comprises an electrode 34, an XY movement table 36, a power supply 37 for machining, and X-, Y-, and Z-axis servomotors 31, 32, and 33. The XY movement table 36, which is driven by the X- and Y-axis servomotors 31 and 32, moves a workpiece 35 in the X and Y directions, and the electrode 34, which is driven by the Z-axis servomotor 33, moves in the Z direction. The machining power supply 37 applies a high-frequency discharge voltage between the electrode 34 and the workpiece 35, and the workpiece 35 is machined to a desired shape by an electric discharge between the electrode 34 and the workpiece 35 caused by a relative movement of the XY movement table 36 and the electrode 34.

The X-, Y-, and Z-axis servomotors 31, 32, and 33, and the machining power supply 37, are controlled by a numerical control device. The following is a description of the arrangement of the numerical control device.

A machining condition setting means 13 outputs various control parameters for controlling the whole electric discharge machine. The various data for the machining condition setting means 13 is input through a CRT/MDI 11. The machining condition setting means 13 outputs a machining power supply parameter to the machining power supply 37, to thereby control the output of the machining power supply 37, and further, the machining condition setting means 13 outputs control parameters to the electrode swing control means 14 and electrode servo feed control means 15. The respective outputs of the electrode swing control means 14 and the electrode servo control feed means 15 are applied to the input of servo control means 16, and based on these outputs, the servo control means 16 controls the servomotors 31, 32, and 33.

A gap voltage waveform detecting means 17a detects the waveform of a gap voltage between the electrode 34 and the workpiece 35, and the output thereof is sent to an A/D converter 18. Further, a discharge current detecting means 17b detects a discharge current, and the output thereof is sent to the A/D converter 18. The A/D converter 18 digitizes the respective output waveforms of the gap voltage waveform detecting means 17a and the discharge current detecting means 17b, and the outputs thereof are sent to a waveform feature extracting means 19. The waveform feature extracting means 19 extracts an average voltage Vm, discharge delay time Tn, and discharge current value In, etc., from the digitized voltage waveforms, and outputs same to a discharge state estimating means 20. Based on this data, the discharge state estimating means 20 estimates and digitizes the discharge state, and the digitized data Si and δSi are fetched as inputs to a fuzzy inference section 12a of a fuzzy control unit 12.

The fuzzy inference section 12a executes a fuzzy inference on the basis of the input data Si and δSi, and sends output data δt and δd to an interpretive section 12b. The symbols δt and δd represent the increments of a jump period and a jump distance, respectively. The interpretive section 12b delivers data δT and δD, which is non-fuzzy data corresponding to the data δt and δd, respectively, to a jump period/distance modifying means 23, and the jump period/distance modifying means 23 modifies the jump period and the jump distance, on the basis of the data δT and δD, and outputs a modified jump period T and a jump distance D to a jump control means 24. The jump control means 24 outputs a control value based on the jump period T and the jump distance D, to the servo control means 16, and thus a jump control of the electric discharge machine is executed. The fuzzy inference in the fuzzy control unit 12 will be described in detail later.

The distance estimating means 21 estimates the distance between the electrode and the workpiece from the output of the average voltage Vm from the waveform feature extracting means 19, and sends it to a computing element 22. The computing element 22 calculates the difference between a target reference value from the machining condition setting means 13 and the estimated distance estimated by the distance estimating means 21, and sends the displacement to the electrode servo feed control means 15. Based on the control parameters from the machining condition setting means 13 and the displacement from the computing element 22, the electrode servo feed control means 15 sends a servo move command to the servo control means 16. The servo control means 16 drives the servomotors 31, 32, and 33 in accordance with move commands output from the electrode swing control means 14, the electrode servo feed control means 15 and the jump control means 24, so that the distance between the electrode 34 and the workpiece 35 is adjusted to a target value set in the machining condition setting means 13.

Before explaining the operation of the fuzzy control unit 12, the operation of the distance estimating means 21 will be described. Various waveforms of the electric discharge between the electrode 34 and the workpiece 35 are shown on the right-hand side of FIG. 6, wherein waveform C1 represents a short state; C2, a state of an arc; C3, a state of a normal spark I; C4, a state of a spark II subject to a substantial discharge delay time; and C5, an open state. As seen from these waveforms, the open and short states are established when the average voltage Vm of the discharge is high and low, respectively. Accordingly, the distance estimating means 21 standardizes the open and short states of the electric discharge as 0 and 1 and outputs these values to the computing element 22. The machining condition setting means 13 sends the electric discharge in the spark-I state as the target reference value to the computing element 22, and thus the displacement of the distance is obtained.

Figure 2:
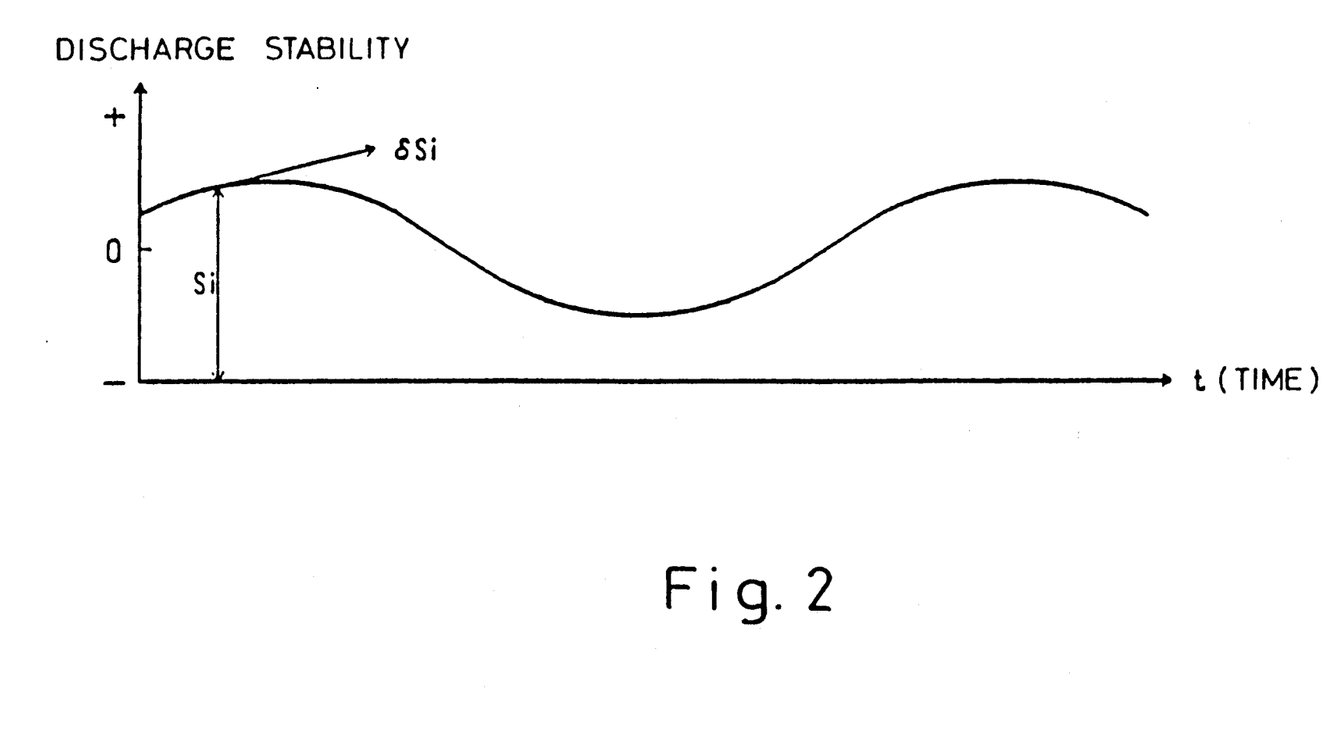
FIG. 2 is a diagram showing a time-based change of the discharge stability.

The discharge state estimating means 20, like the distance estimating means 21, receives the average voltage Vm and the discharge delay time Tn from the waveform feature extracting means 19. Based on the input average voltage Vm and discharge delay time Tn, the spark-I, open, and short states of the electric discharge are standardized as 0, +1 and −1, respectively. The value Si of each of these states is given as a discharge stability. FIG. 2 shows the time-based change of the discharge stability Si. The rate of this change, that is, the differential δSi of the discharge stability, is given as a discharge stability change δSi. The discharge state estimating means 20 calculates the discharge stability Si and the rate of change δSi thereof, and outputs same to the fuzzy control unit 12. A method also exists by which the discharge stability can be more accurately estimated by using the discharge current In in addition to the average voltage Vm and the discharge delay time Tn.

Figure 3:
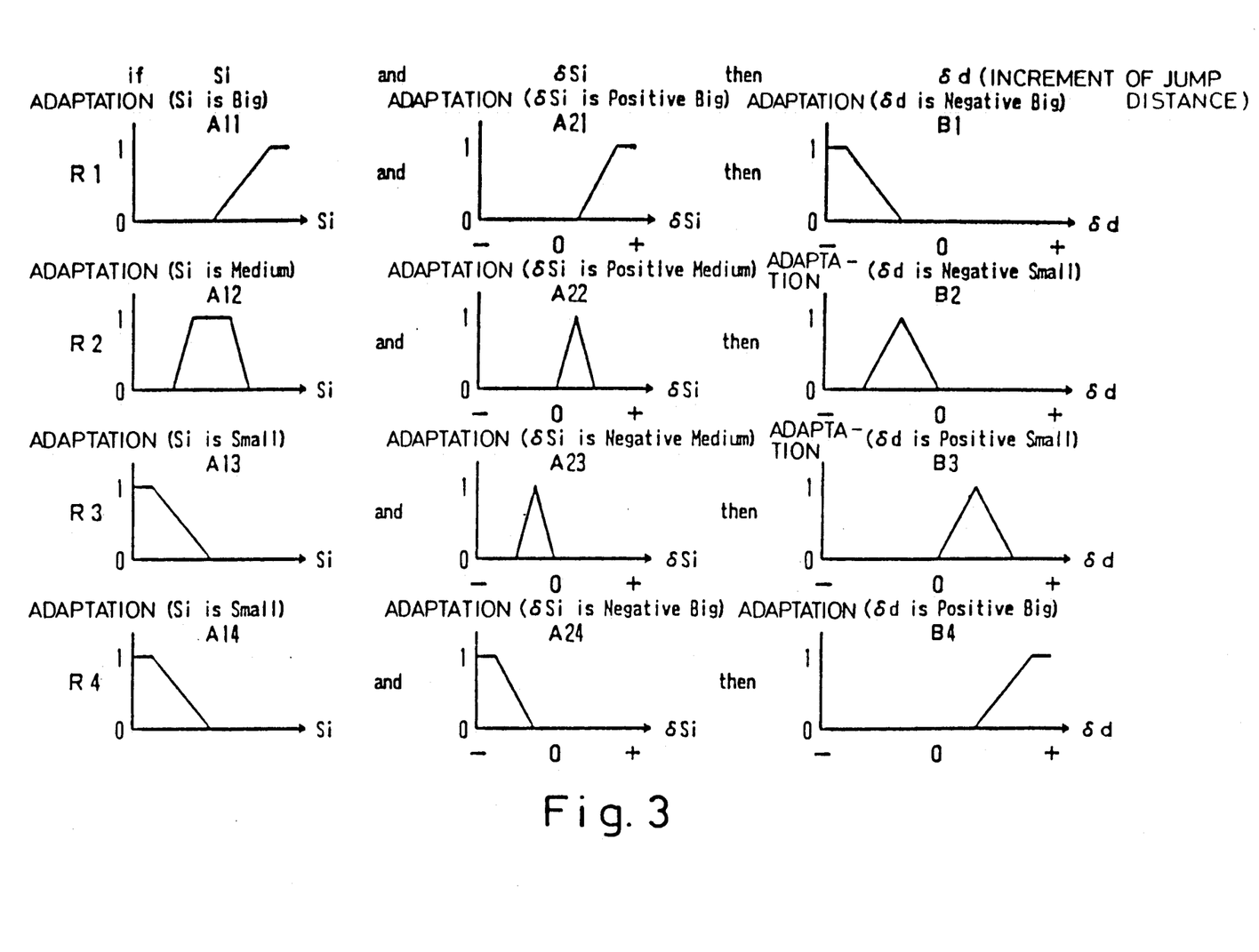
FIG. 3 illustrates an example of a fuzzy rule for inferring an increment of a jump distance.
Figure 4:
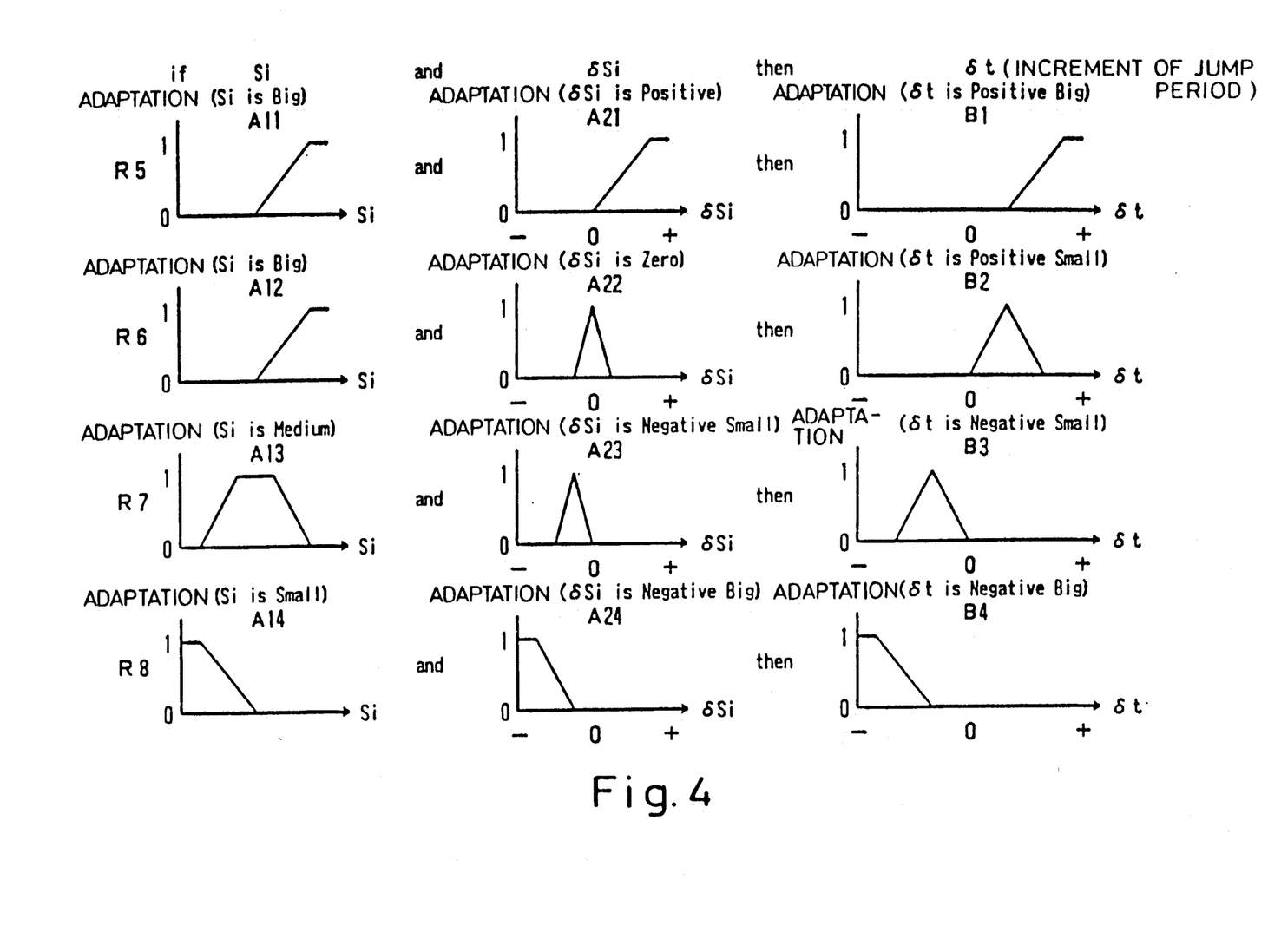
FIG. 4 illustrates an example of a fuzzy rule for inferring an increment of a jump period.

Based on the discharge stability Si and the rate of change δSi thereof, the fuzzy control unit 12 executes a fuzzy inference. FIGS. 3 and 4 show the rule of this fuzzy inference; wherein FIG. 3 illustrates an example of the fuzzy rule for inferring the increment δd of the jump distance, and FIG. 4 illustrates an example of the fuzzy rule for inferring the increment δt of the jump period. Each rule consists of four rules.

First, the rule for inferring the increment δd of the jump distance shown in FIG. 3 will be described. In FIG. 3, A11, A12, A13, and A14 represent membership functions related to the discharge stability Si; A21, A22, A23 and A24 represent membership functions related to the rate of change δSi of the discharge stability; and B1, B2, B3, and B4 represent membership functions related to the increment δd of the jump distance. The axis of ordinate of these membership functions represents the adaptation of each inference.

The first rule R1 implies that, if Si and δSi are Big and Positive Big, respectively, then δd is Negative Big.

The second rule R2 implies that, if Si and δSi are Medium and Positive Medium, respectively, then δd is Negative Small.

The third rule R3 implies that. if Si and δSi are Small and Negative Medium. respectively. then δd is Positive Small.

The fourth rule R4 implies that. if Si and δSi are Small and Negative Big. respectively. then δd is Positive Big.

The following is a description of the rule for inferring the δt of the jump period shown in FIG. 4. In FIG. 4. A11, A12. A13. and A14 represent membership functions related to the discharge stability Si; A21. A22, A23 and A24 represent membership functions related to the rate of change δSi of the discharge stability; and B1. B2, B3. and B4 represent membership functions related to the increment δt of the jump distance. The axis of ordinate of these membership functions represents the adaptation of each inference.

The fifth rule R5 implies that, if Si and δSi are Big and Positive, respectively. then δt is Positive Big.

The sixth rule R6 implies that, if Si and δSi are Big and Zero. respectively. then δd is Positive Small.

The seventh rule R7 implies that, if Si and δSi are Medium and Negative Small. respectively. then δd is Negative Small.

The eighth rule R8 implies that, if Si and δSi are Small and Negative Big. respectively, then δd is Negative Big.

The fuzzy inference section 12a executes inference on the basis of these eight rules, and delivers the values of the respective increments δd and δt of the jump distance and the jump period to the interpretive section 12b. The values of the respective increments δd and δt of the jump distance and the jump period are obtained by the gravity center method or the like. in accordance with the aforementioned fuzzy rules. The obtained increments δd and δt of the jump distance and the jump period are digitized in the interpretive section 12b. and are sent to the jump period/distance modifying means 23, whereupon a jump control is effected by means of the jump control means 24.

These fuzzy rules and membership functions are stored as a data base, and the fuzzy inference also may be made by using this data base.

Alternatively, a plurality of data bases may be provided, depending on the material of the workpiece and the machining method. etc., and the fuzzy inference is effected by selecting the required data bases.

Figure 5:
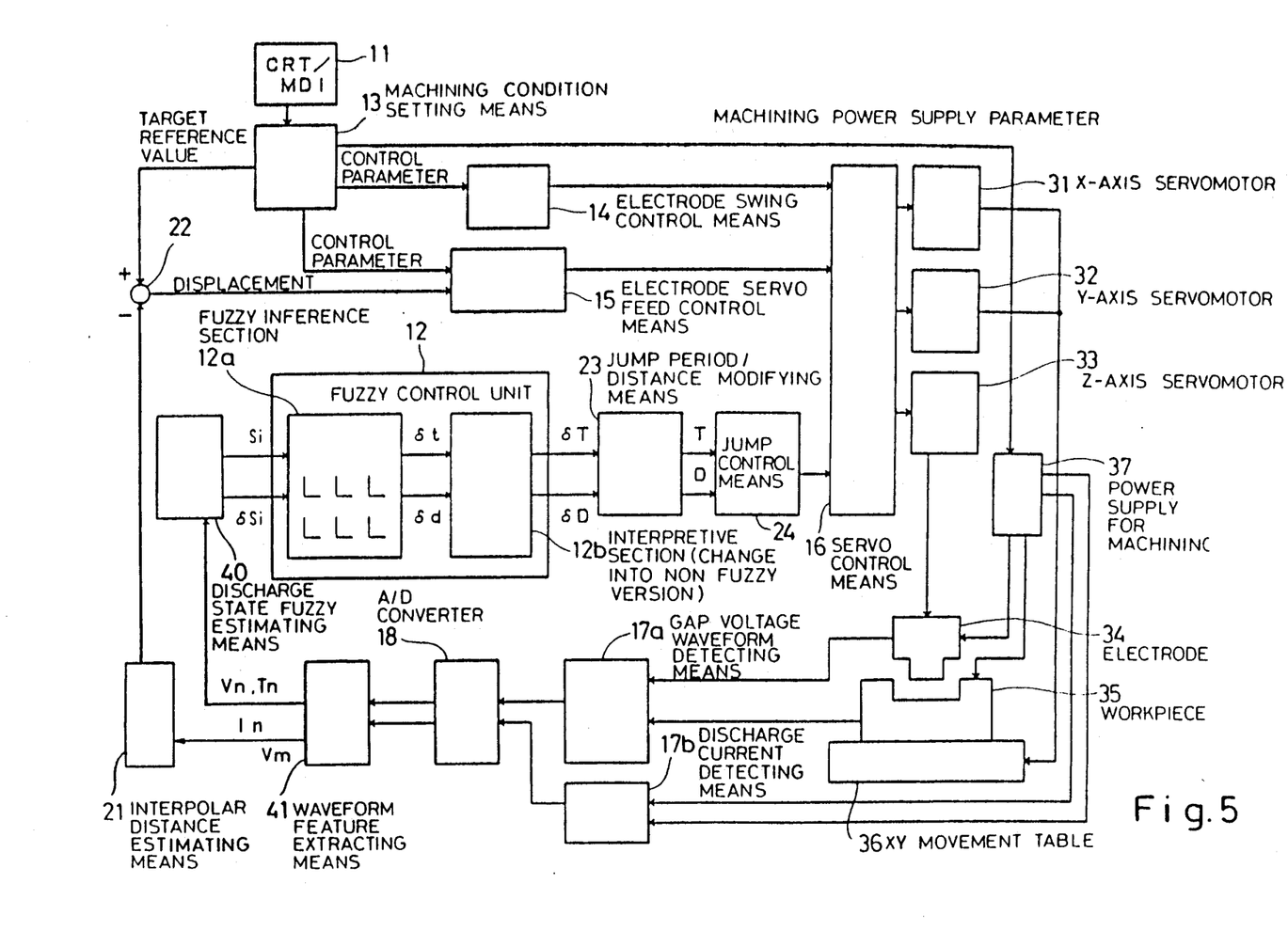
FIG. 5 is a diagram showing another embodiment of the present invention.

FIG. 5 is a diagram showing another embodiment of the present invention. Since like reference numerals are used to designate the same components as shown in FIG. 1, a description of those components is omitted. In the present embodiment, a discharge state fuzzy estimating means outputs the discharge stability Si and the rate of change δSi thereof by fuzzy inference. More specifically, in the present embodiment, the discharge state is estimated by fuzzy inference in accordance with the maximum value Vn of the discharge voltage and discharge delay time Tn output from the waveform feature extracting means 41.

Accordingly, the present embodiment differs from that shown in FIG. 1 in that the waveform feature extracting means 41 delivers the maximum value Vn of the discharge voltage and the discharge delay time Tn to the discharge state fuzzy estimating means 40, and the discharge state fuzzy estimating means 40 executes a fuzzy inference in accordance with these outputs.

Figure 6:
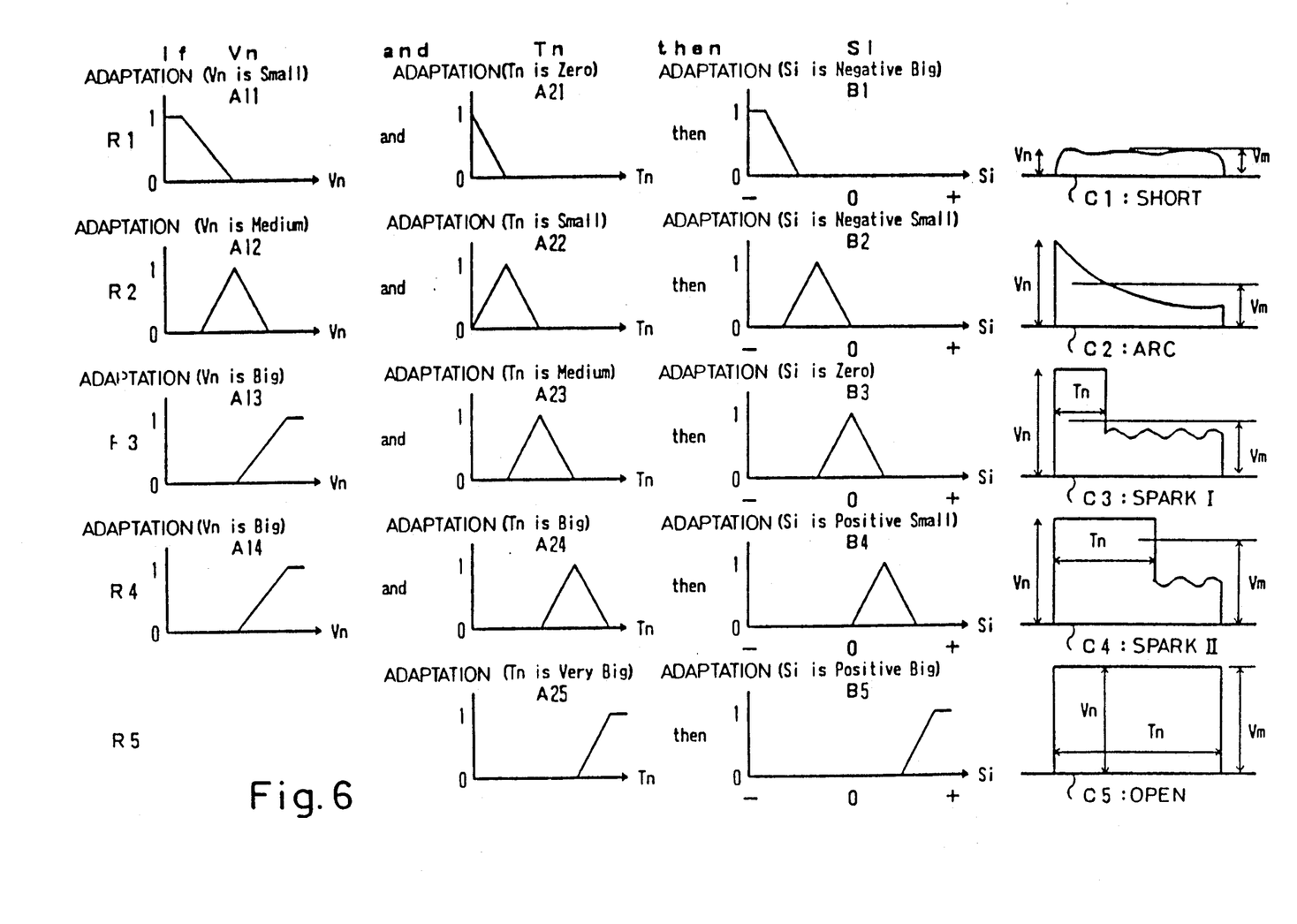
FIG. 6 illustrates an example of a fuzzy rule for inferring the discharge stability.

A fuzzy control unit in the discharge state fuzzy estimating means 40 executes a fuzzy inference in accordance with the maximum value Vn of the discharge voltage and the discharge delay time Tn. and FIG. 6 shows the rule of this fuzzy inference. Namely. FIG. 6 illustrates an example of the fuzzy rule for inferring the discharge stability Si, which fuzzy rule consists of five rules.

In FIG. 6, A11. A12. A13. and A14 represent membership functions related to the maximum value Vn of the discharge voltage; A21. A22. A23. A24, and A25 represent membership functions related to the discharge delay time Tn; and B1, B2, B3, B4, and B5 represent membership functions related to the discharge stability Si. The axis of ordinate of these membership functions represents the adaptation of each inference. A discharge state waveform corresponding to each rule is indicated on the right of the rule.

The first rule R1 implies that. if Vn and Tn are Small and Zero, respectively, then Si is Negative Big (SHORT STATE).

The second rule R2 implies that, if Vn and Tn are Medium and Small, respectively, then Si is Negative Small (ARC STATE).

The third rule R3 implies that, if Vn and Tn are Big and Medium. respectively, then Si is Zero (SPARK I STATE).

The fourth rule R4 implies that, if Vn and Tn are both Big. then Si is Positive Small (SPARK II STATE).

The fifth rule R5 implies that, if Tn is Very Big, then Si is Positive Big (OPEN STATE).

The fuzzy control unit of the discharge state fuzzy estimating means 40 executes the inference on the basis of these five rules, digitizes the discharge stability Si and the discharge stability rate of change δSi obtained on the basis of the discharge stability Si at the interpretive section thereof, and outputs these values to a fuzzy control unit 12. The fuzzy control unit 12 executes a fuzzy inference in the same manner as described above, to thereby effect a jump control.

According to the present embodiment, as described above, the fuzzy inference is executed with the discharge state as an input, the optimum jump distance and jump period are obtained, and the jump control is executed on the basis of these factors, and accordingly, the optimum jump control can be effected corresponding to the momentarily changing discharge state. Therefore, since wasteful jump controls can be reduced, in contrast to the conventional case, the machining speed is increased and the discharge state stabilized, to thereby provide an outstanding effect such as an improvement in the accuracy of machined surfaces. Moreover, since the jump distance and the jump period can be automatically determined and controlled, data on the jump need not be set as a machining condition.

According to the present invention, as described above, an optimum and high-level control can be effected depending on the discharge state, thus ensuring a considerable improvement in the machining accuracy and machining speed, in contrast with the conventional jump control in which the jump conditions are determined on the basis of experience and experiments.

I claim:

1. A jump control system for an electric discharge machine having a discharge state, comprising:
    first control means for performing fuzzy control to set a jump period and a jump distance to optimum values based on the discharge state of the electric discharge machine; and second control means for controlling movement of an electrode relative to a workpiece in response to the jump period and the jump distance.

2. A jump control system for an electric discharge machine according to claim 1, wherein said first control means comprises means for performing a plurality of fuzzy rules and membership functions previously stored as a data base and selectable depending on a type of machining.

3. A jump control system for an electric discharge machine according to claim 1, further comprising detecting means for providing the discharge state including a time-based rate of change by digitizing a waveform of a gap voltage between said electrode of the electric discharge machine and said workpiece.

4. A jump control system for an electric discharge machine according to claim 2, further comprising detecting means for determining the discharge state based on at least one of a waveform of a gap voltage of the electric discharge machine and a waveform of a discharge current of the electric discharge machine.

5. A jump control system for an electric discharge machine according to claim 2, further comprising detecting means for determining the discharge state by a fuzzy inference based on at least one of a gap voltage and a discharge current.

6. A jump control method, comprising the steps of:
(a) determining a discharge state of an electric discharge machine;
(b) performing fuzzy control based on the discharge state to determine a jump period and a jump distance; and
(c) controlling movement of an electrode relative to a workpiece in response to the jump period and the jump distance in said step (b).

7. A jump control method according to claim 6, wherein said method further comprises the step of (d) selecting a type of machining; and
wherein said step (b) comprises the substep of (b1) performing fuzzy control using at least one of a plurality of fuzzy rules and membership functions dependent on the type of machining selected in said step (d).

8. A jump control method according to claim 7, wherein said step (a) comprises the substep of (a1) determining the discharge state based on at least one of a waveform of a gap voltage of the electric discharge machine and a waveform of a discharge current of the electric discharge machine.

9. A jump control method according to claim 7, wherein said step (a) comprises the substep of (a1) performing a fuzzy inference based on at least one of a gap voltage of the electric discharge machine and a discharge current of the electric discharge machine to determine the discharge state.

10. A jump control method according to claim 6, wherein said step (a) comprises the substep of (a1) performing a fuzzy inference based on at least one of a gap voltage of the electric discharge machine and a discharge current of the electric discharge machine to determine the discharge state.

11. A jump control method according to claim 6, wherein said step (a) comprises the substep of (a1) digitizing the discharge state based on a waveform of a gap voltage between said electrode of the electric discharge machine and said workpiece to include a time-based rate of change of the discharge state.

* * * * *